(12) United States Patent
Call

(10) Patent No.: US 6,840,529 B2
(45) Date of Patent: Jan. 11, 2005

(54) ARTICULATED PICKUP TRUCK CAMPER/TRAILER

(76) Inventor: David B. Call, 2998 Loma Pl., Boulder, CO (US) 80301

( * ) Notice: Subject to any disclaimer, the term of this patent is extended or adjusted under 35 U.S.C. 154(b) by 0 days.

(21) Appl. No.: 10/273,798

(22) Filed: Oct. 17, 2002

(65) Prior Publication Data
US 2004/0075239 A1 Apr. 22, 2004

(51) Int. Cl.[7] .............................................. B60D 5/00
(52) U.S. Cl. .................. 280/403; 280/427; 280/455.1; 296/166; 105/18
(58) Field of Search ............................. 280/403, 400, 280/475, 491.4, 406.2, 420, 427, 455.1; 296/166, 158; 105/18, 19, 9

(56) References Cited

U.S. PATENT DOCUMENTS

| | | | |
|---|---|---|---|
| 2,001,619 A | | 5/1935 | Levoyer |
| 2,843,417 A | * | 7/1958 | Wahl et al. ............... 280/403 |
| 3,638,991 A | | 2/1972 | Hathaway, Jr. |
| 3,719,244 A | | 3/1973 | Miller et al. |
| 3,744,841 A | | 7/1973 | Schmidt |
| 3,834,752 A | | 9/1974 | Cook et al. |
| 3,843,158 A | * | 10/1974 | Schwellenbach ........... 280/403 |
| 3,853,348 A | * | 12/1974 | Bjork et al. ............... 296/166 |
| 4,157,201 A | | 6/1979 | Collins et al. |
| 4,247,128 A | | 1/1981 | Knapp et al. |
| 4,342,370 A | | 8/1982 | Hagin et al. |
| 4,403,802 A | | 9/1983 | Jones |
| 4,452,465 A | * | 6/1984 | Bourke .................... 280/403 |
| 4,458,937 A | | 7/1984 | Beckmann et al. |
| 4,462,628 A | | 7/1984 | Gregg |
| 4,477,099 A | | 10/1984 | Luyckx |
| 4,503,779 A | | 3/1985 | Chadwick |
| 4,504,049 A | | 3/1985 | Straub |
| 4,518,188 A | | 5/1985 | Witten |
| 4,762,191 A | | 8/1988 | Hagin et al. |
| 4,860,665 A | * | 8/1989 | Schmidt .................... 105/18 |
| 4,948,157 A | | 8/1990 | Thudt |
| 5,445,236 A | * | 8/1995 | Kuhn ...................... 180/14.1 |
| 5,546,866 A | * | 8/1996 | Koch ....................... 105/8.1 |
| 5,785,372 A | | 7/1998 | Glatzmeier et al. |
| 6,085,403 A | * | 7/2000 | Petit ........................ 29/454 |

FOREIGN PATENT DOCUMENTS

| | | | | |
|---|---|---|---|---|
| DE | 4035636 | * | 5/1992 | ....... B60D/1/167 |
| DE | 43 43 084 | | 6/1995 | |
| EP | 0 631890 A1 | | 2/1994 | |
| GB | 1196077 | | 6/1970 | |
| WO | WO 91/02672 | | 3/1991 | |

* cited by examiner

*Primary Examiner*—Avraham Lerner
(74) *Attorney, Agent, or Firm*—John E. Reilly

(57) ABSTRACT

A recreational vehicle is made up of a pickup truck, a camper which is releasably mounted on the pickup truck and includes an accessway between the cab of the pickup truck and the camper, and a trailer which communicates with the camper through an articulated passage or walkway to permit movement of occupants between the camper and trailer while the vehicle is in motion.

21 Claims, 16 Drawing Sheets

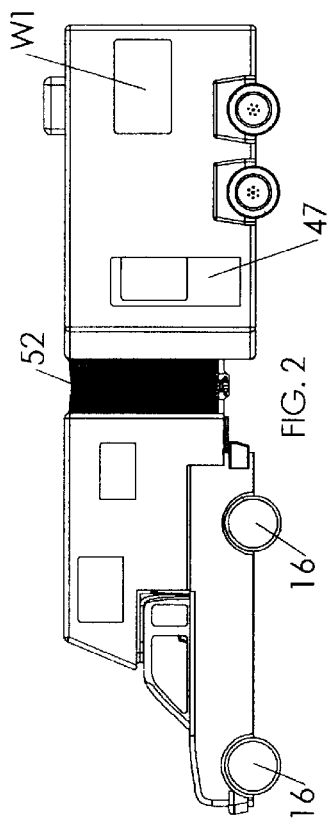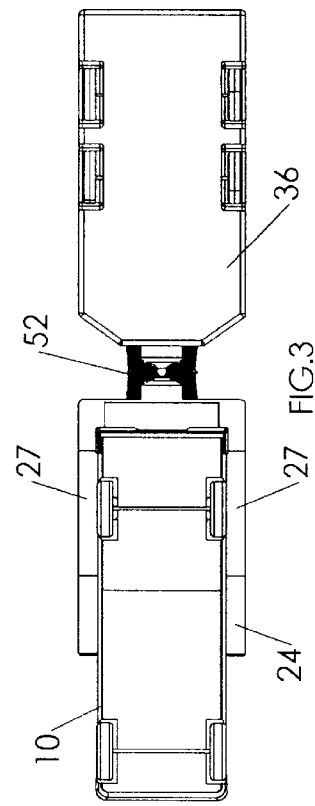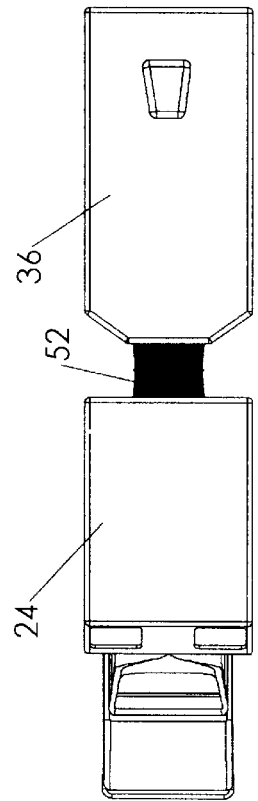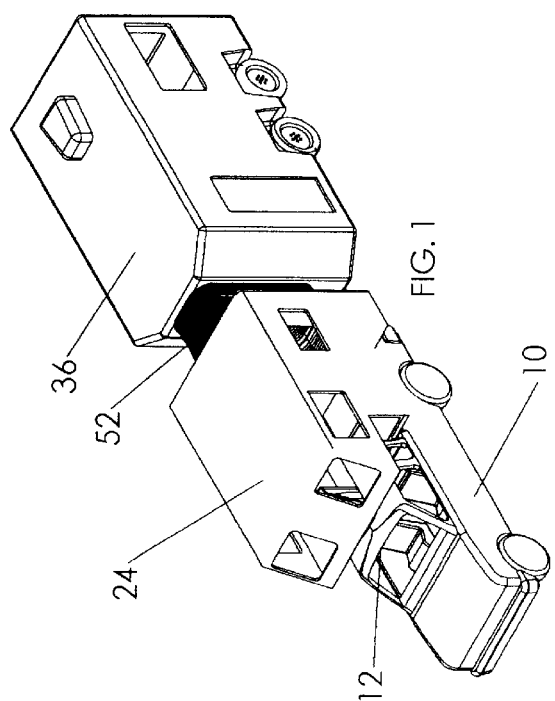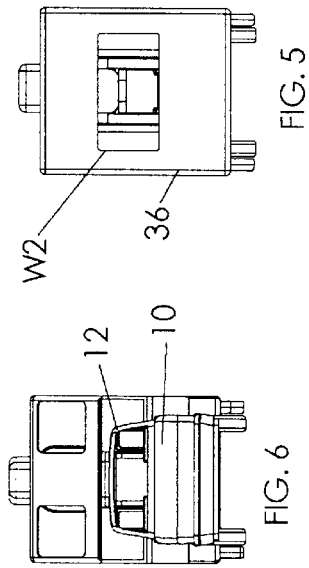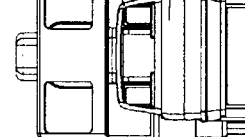

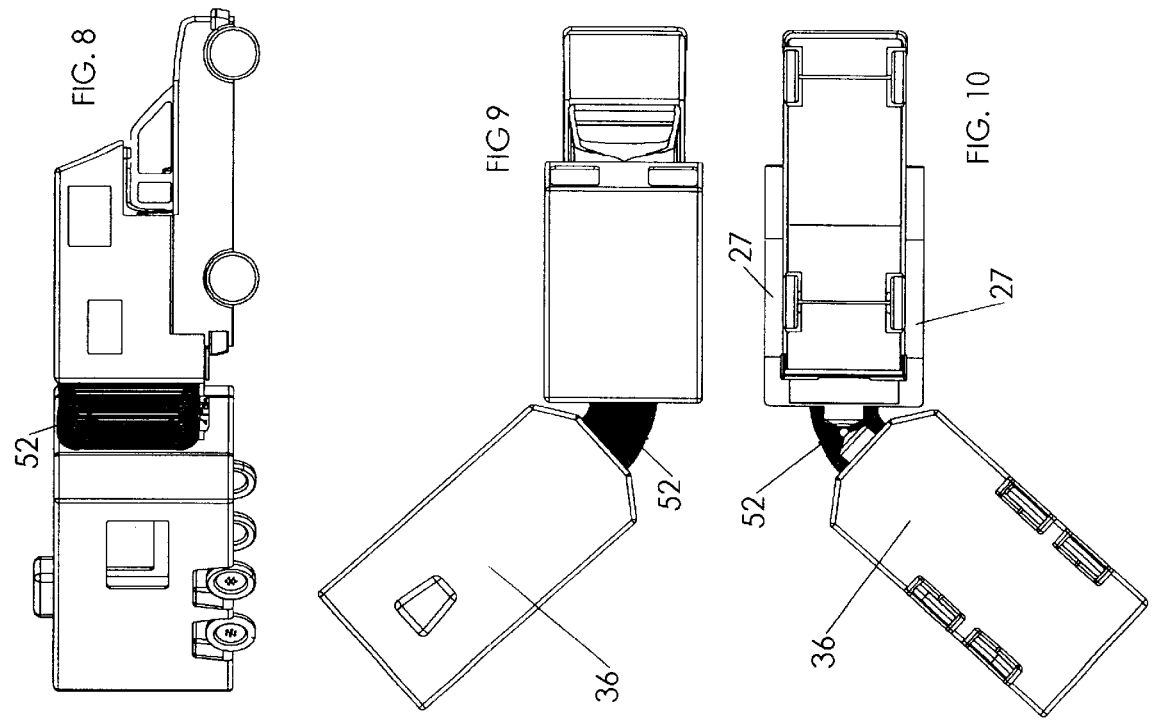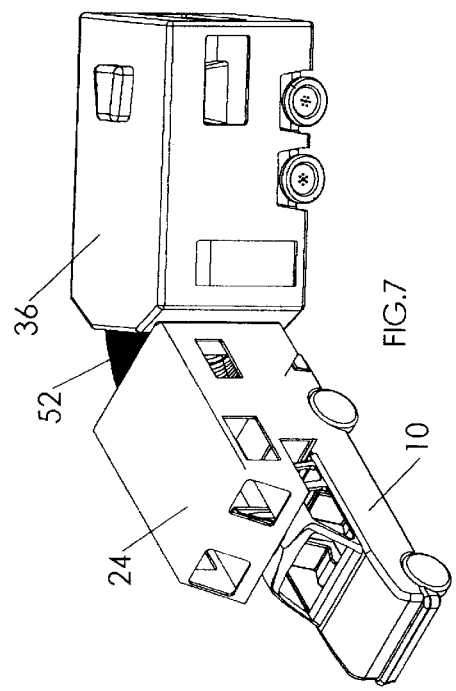

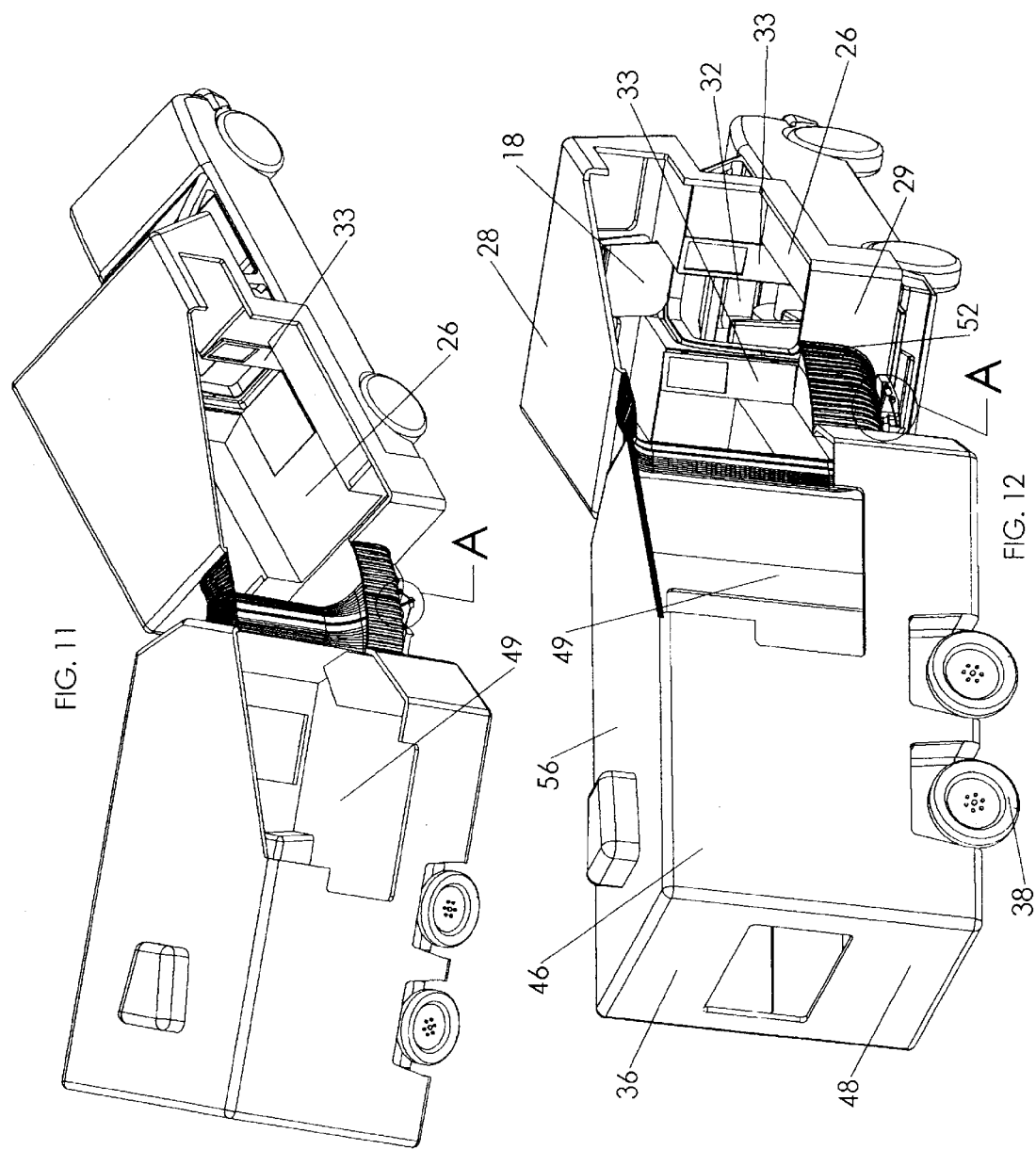

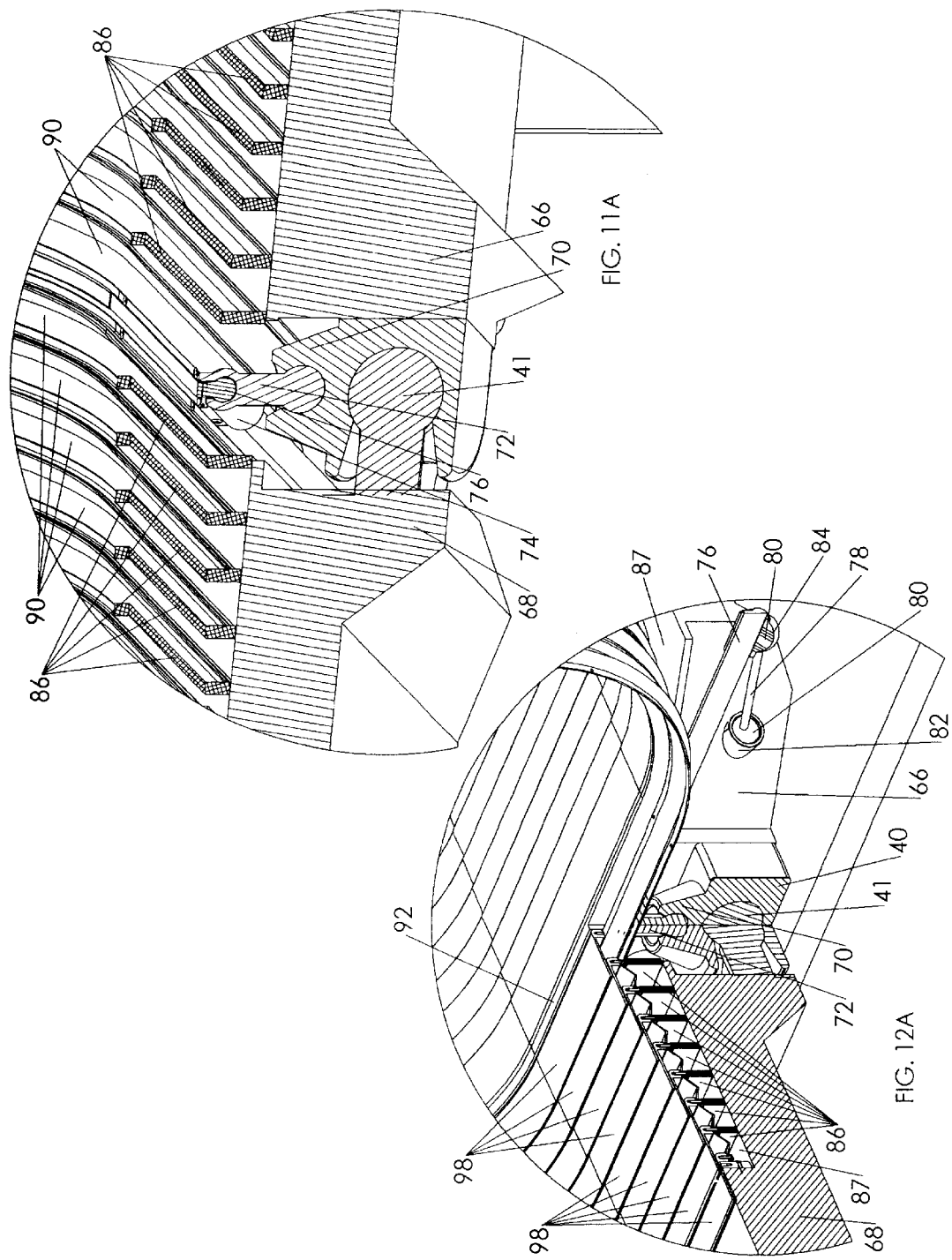

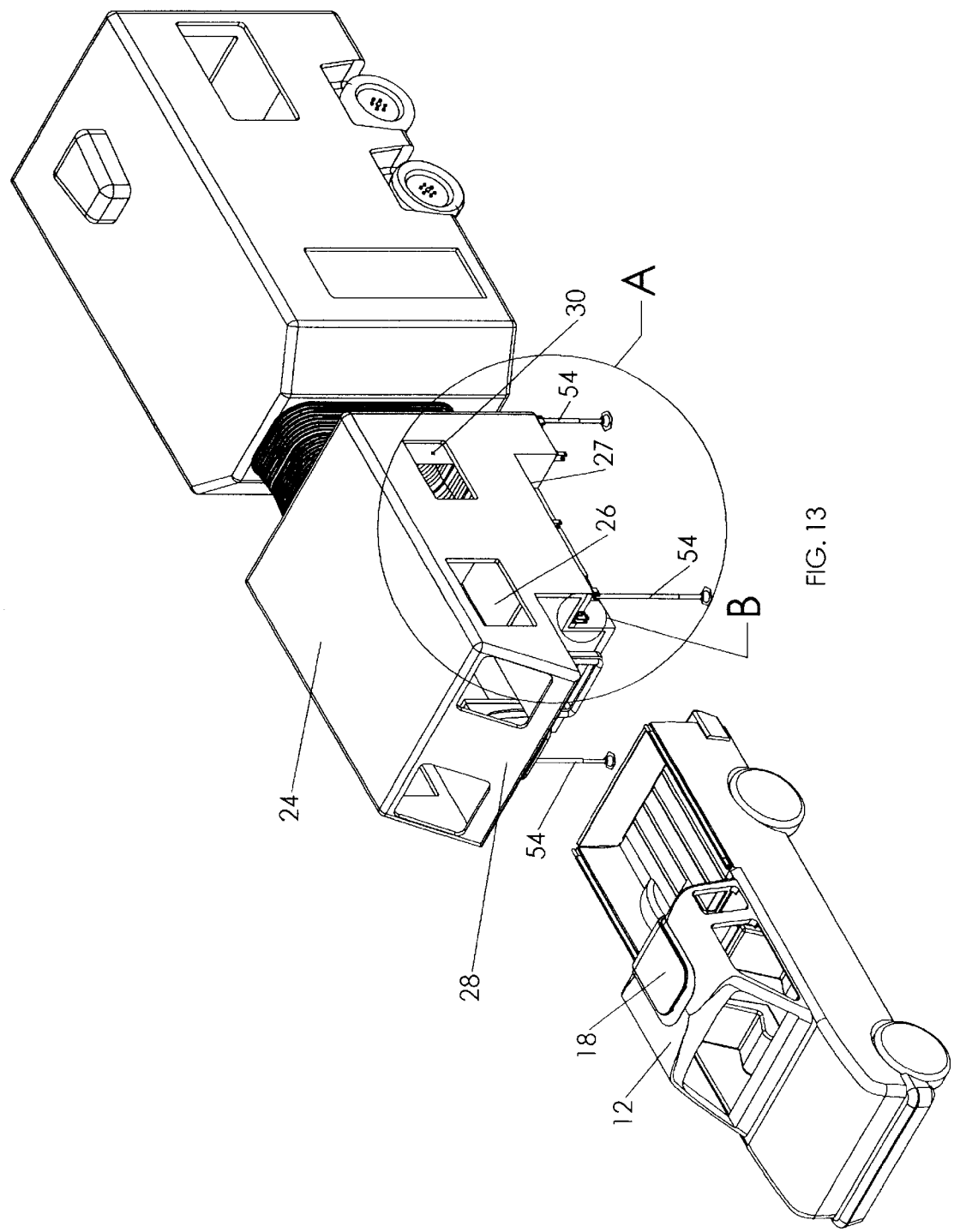

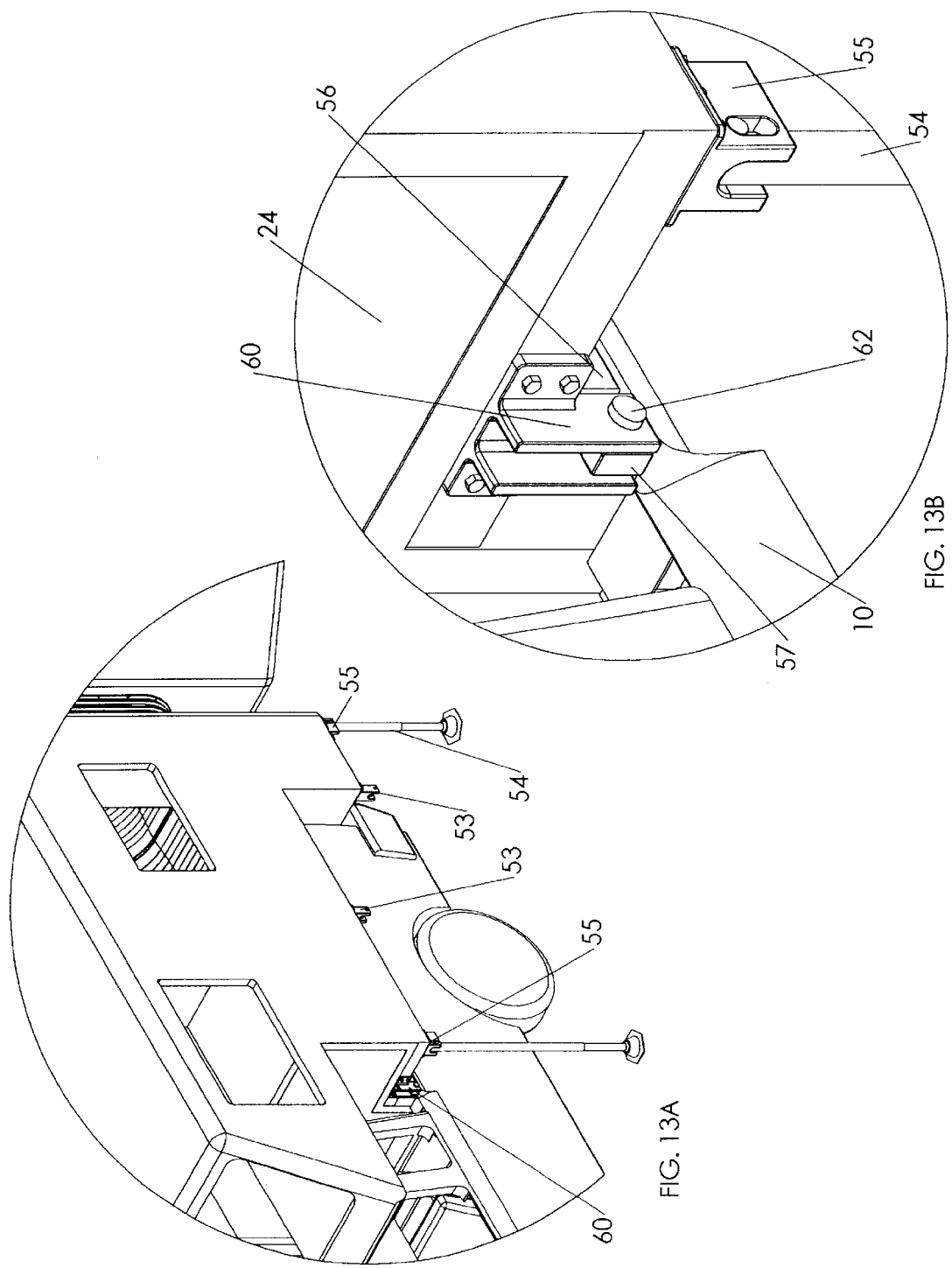

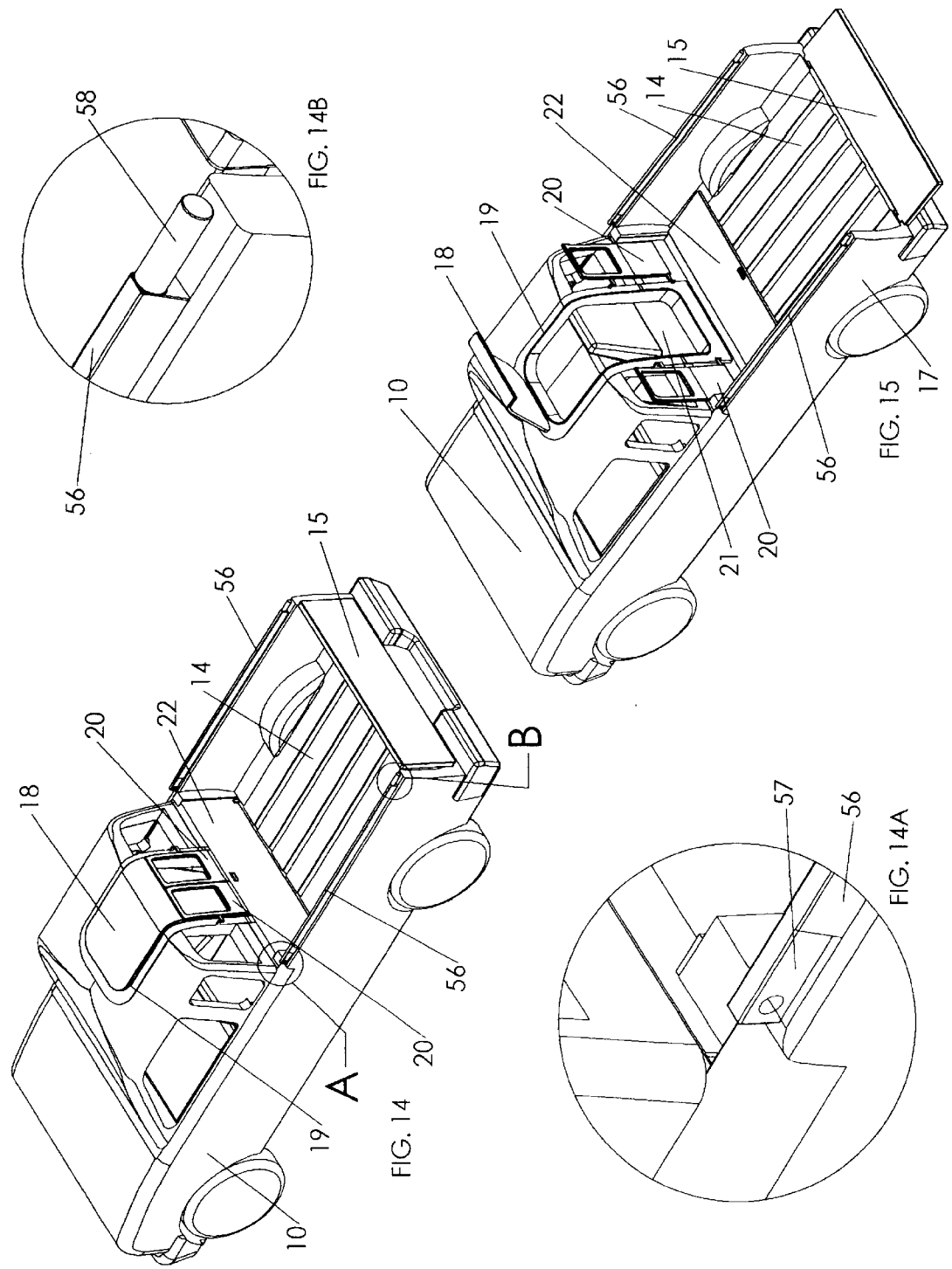

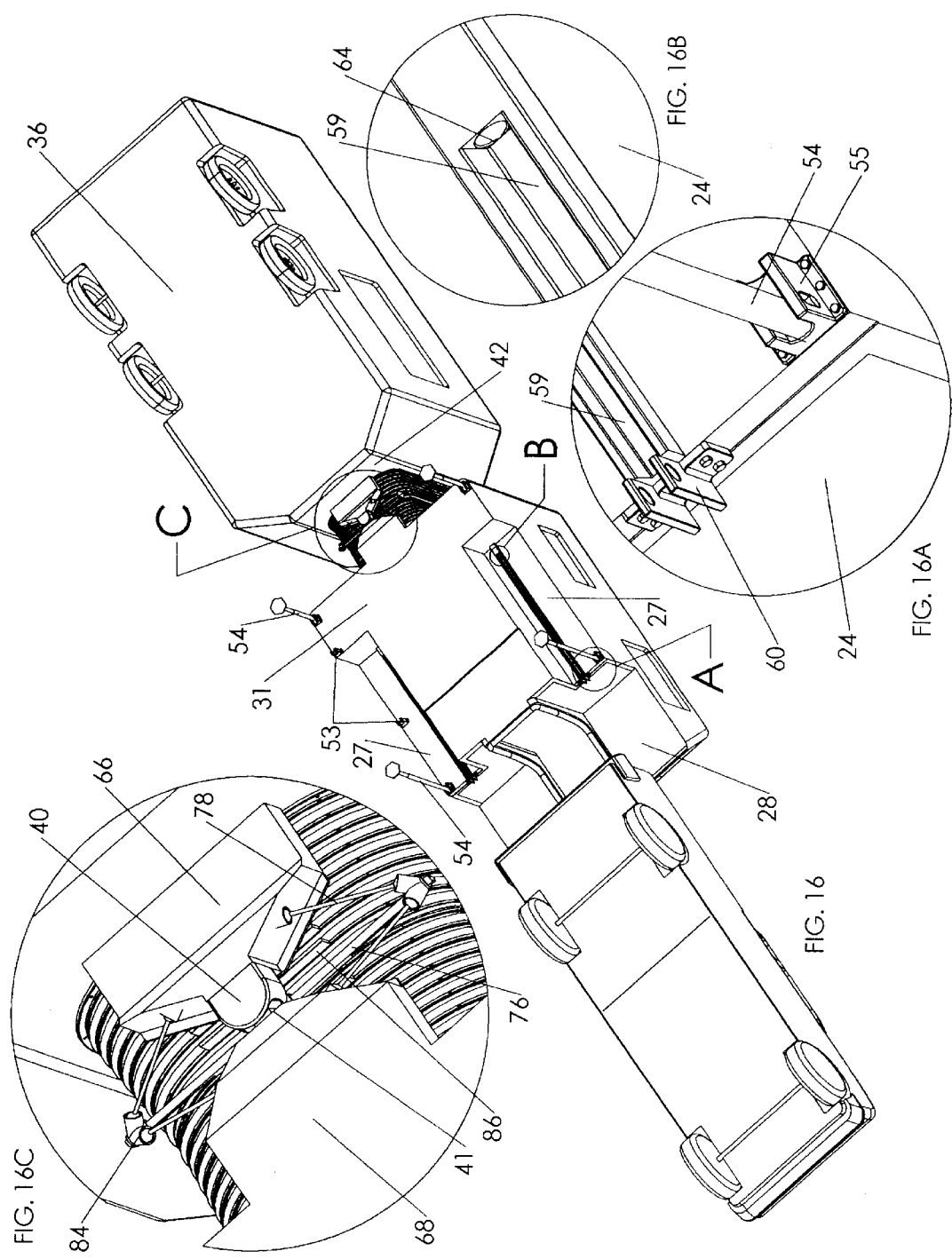

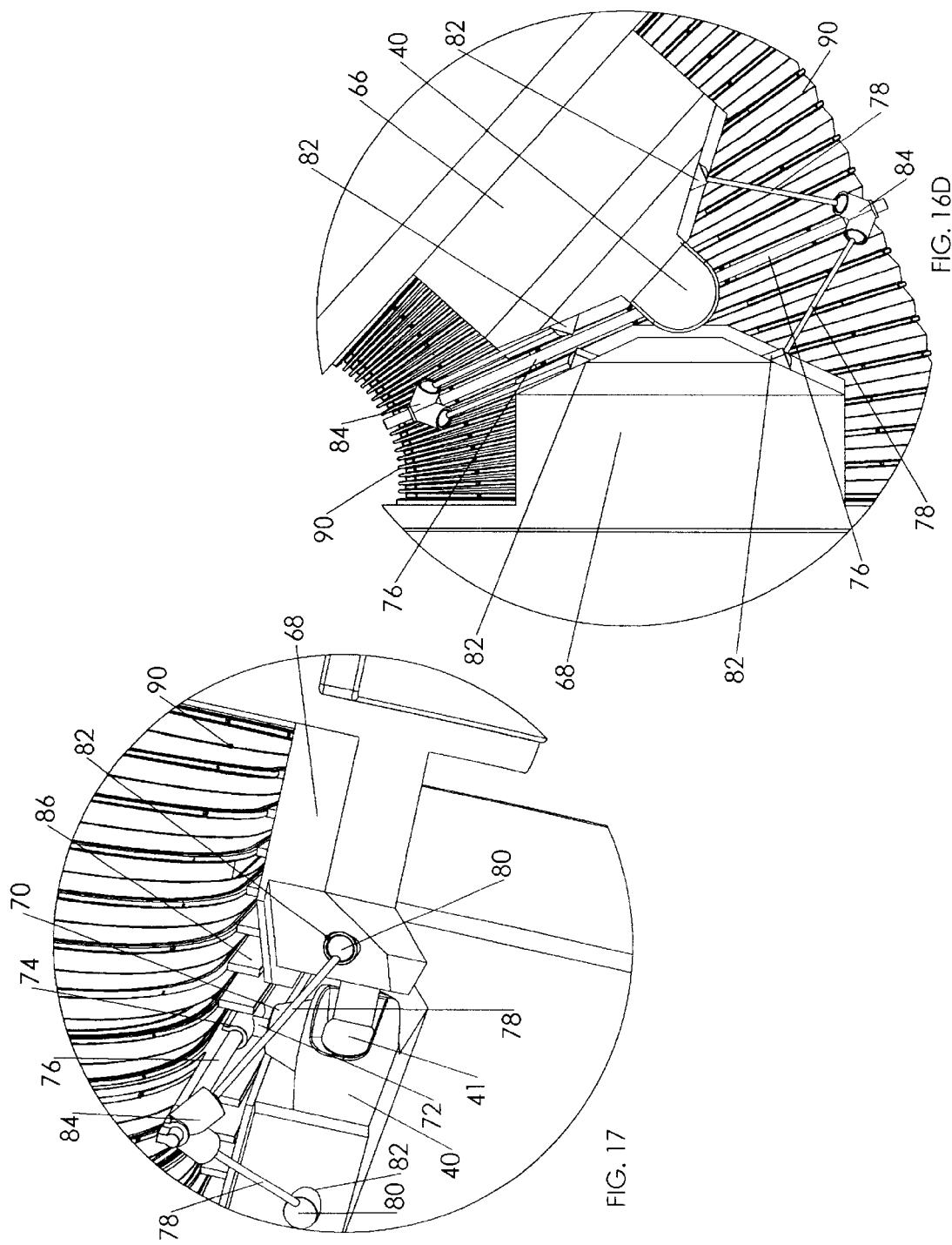

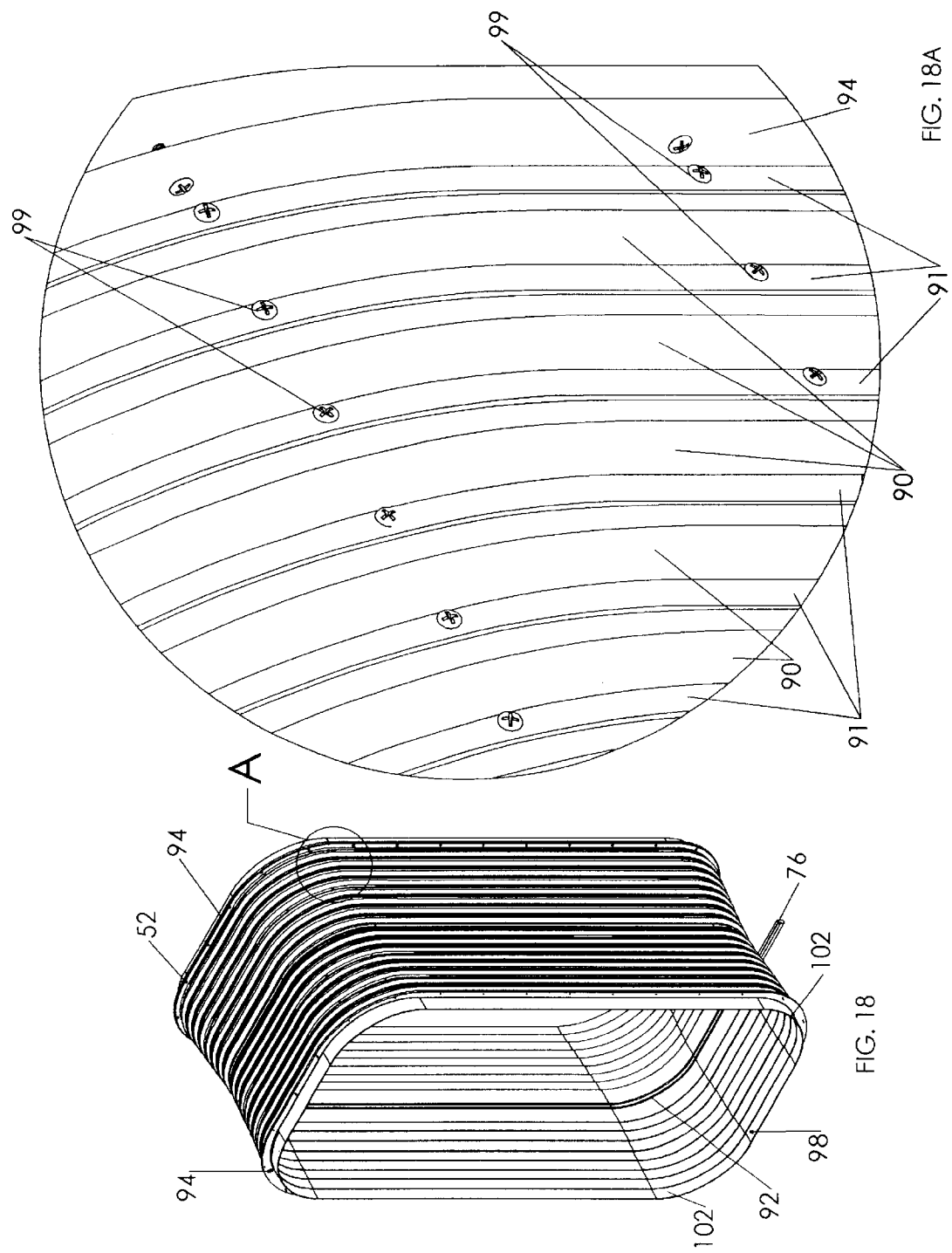

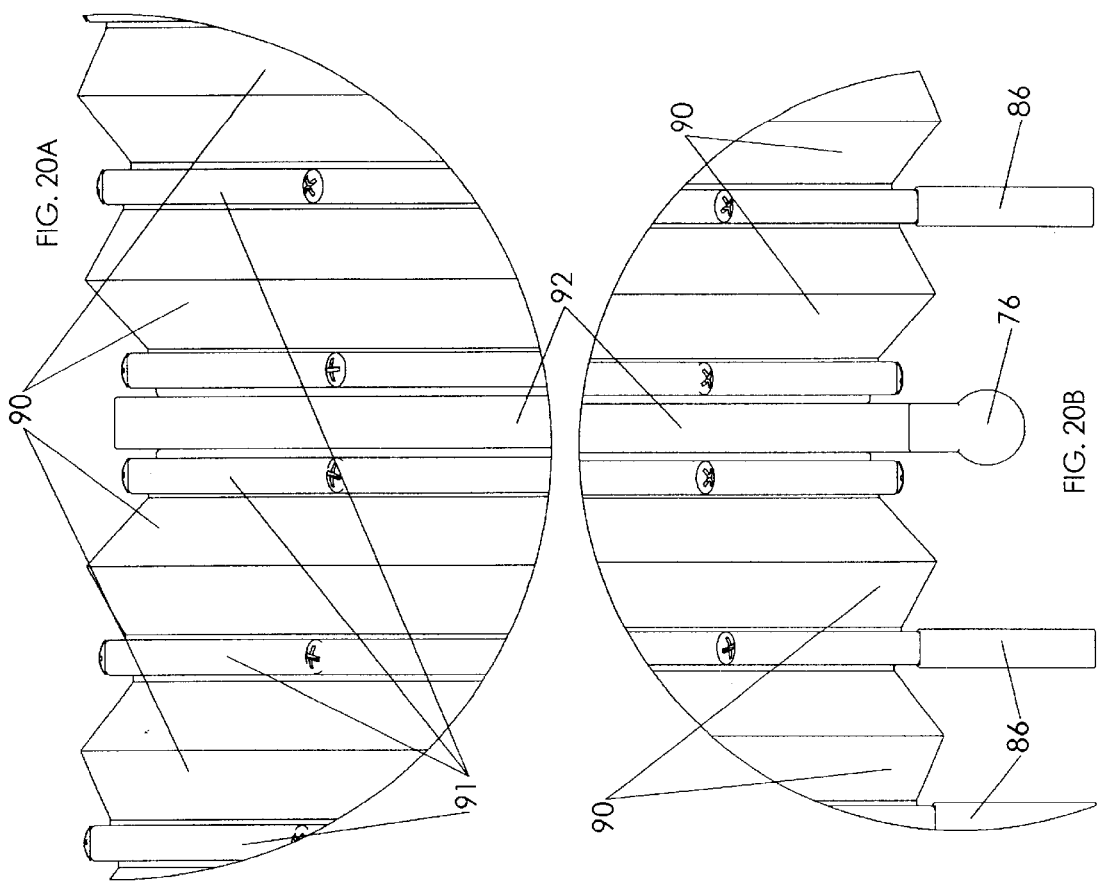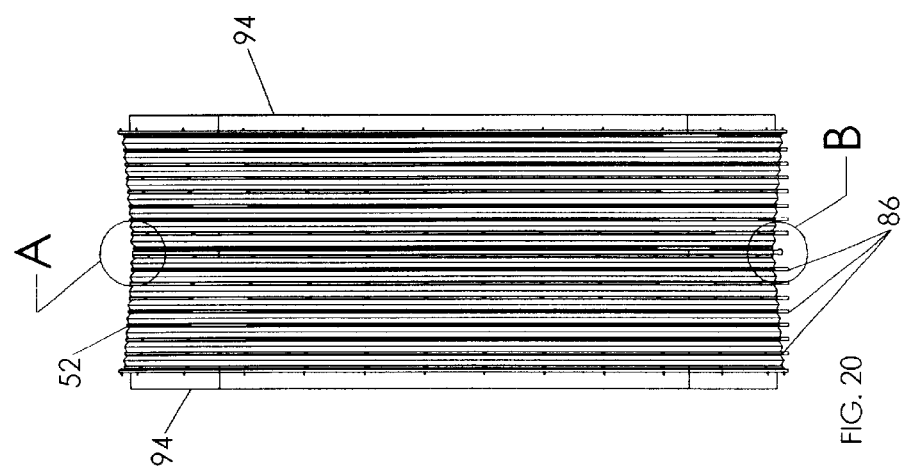

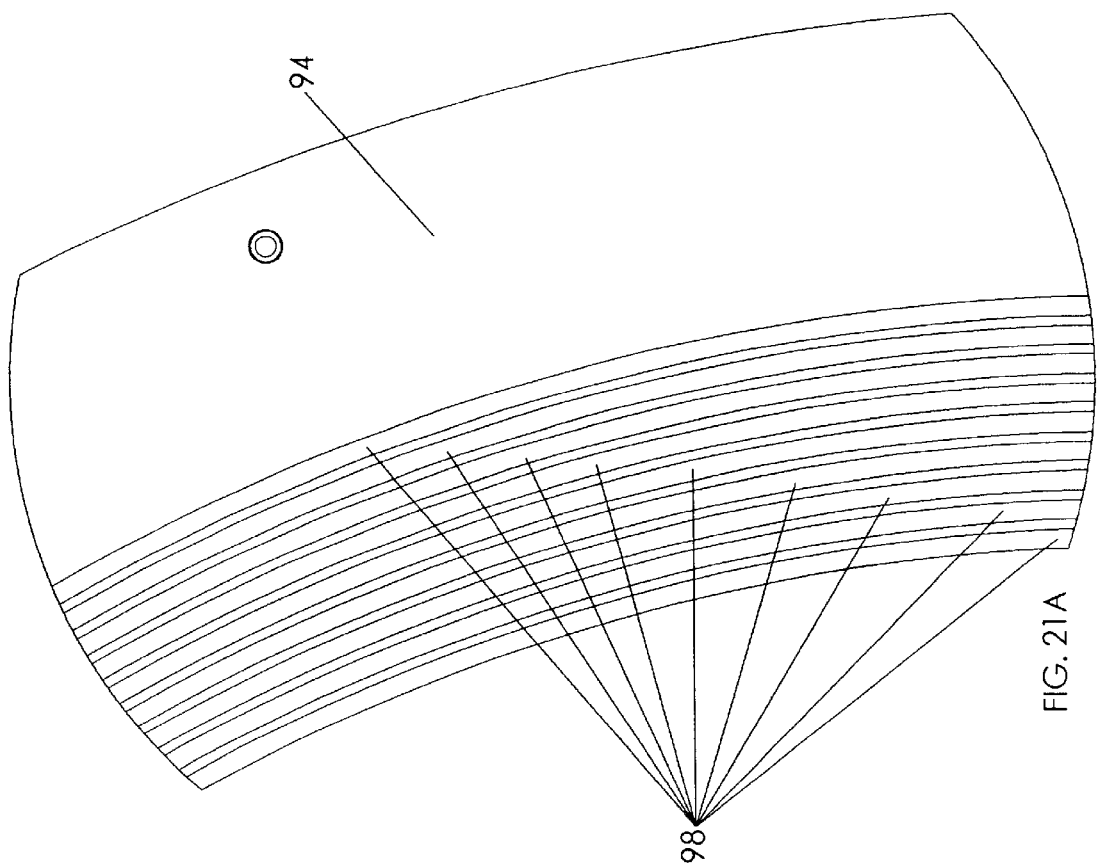
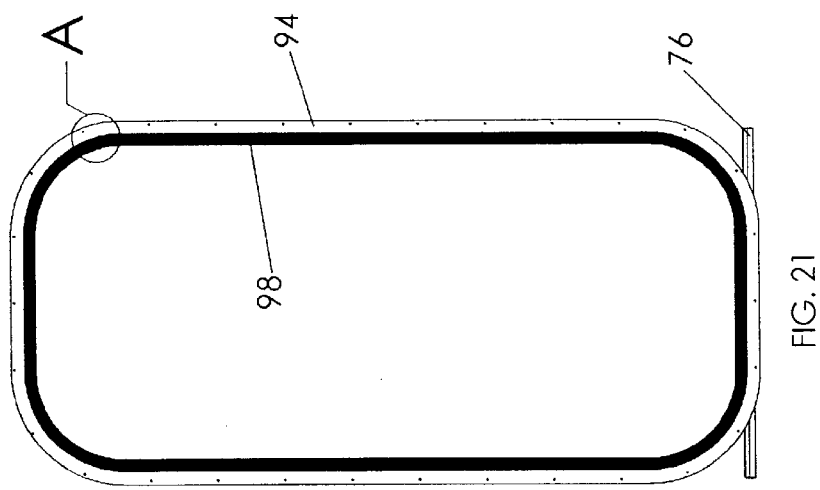

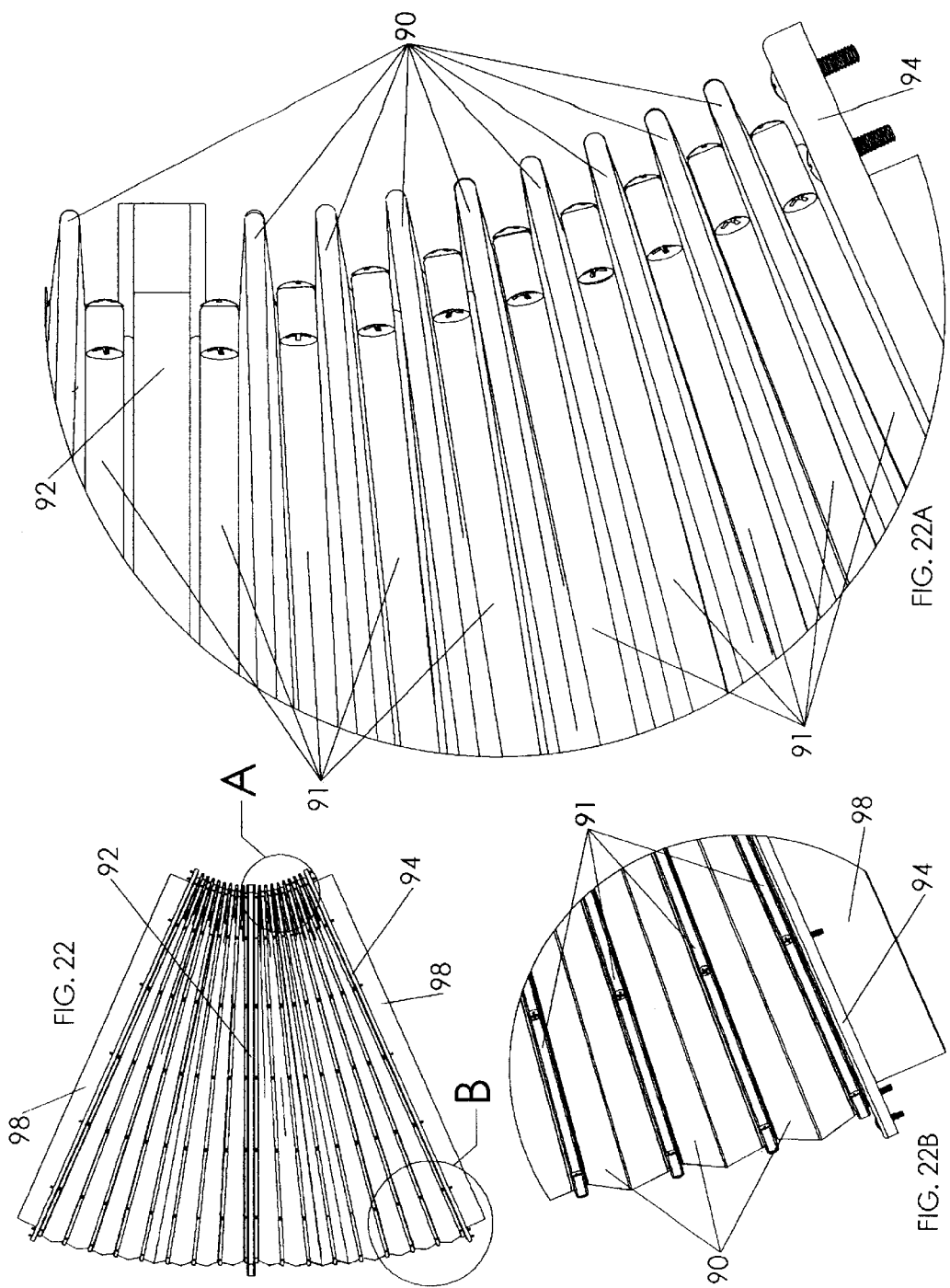

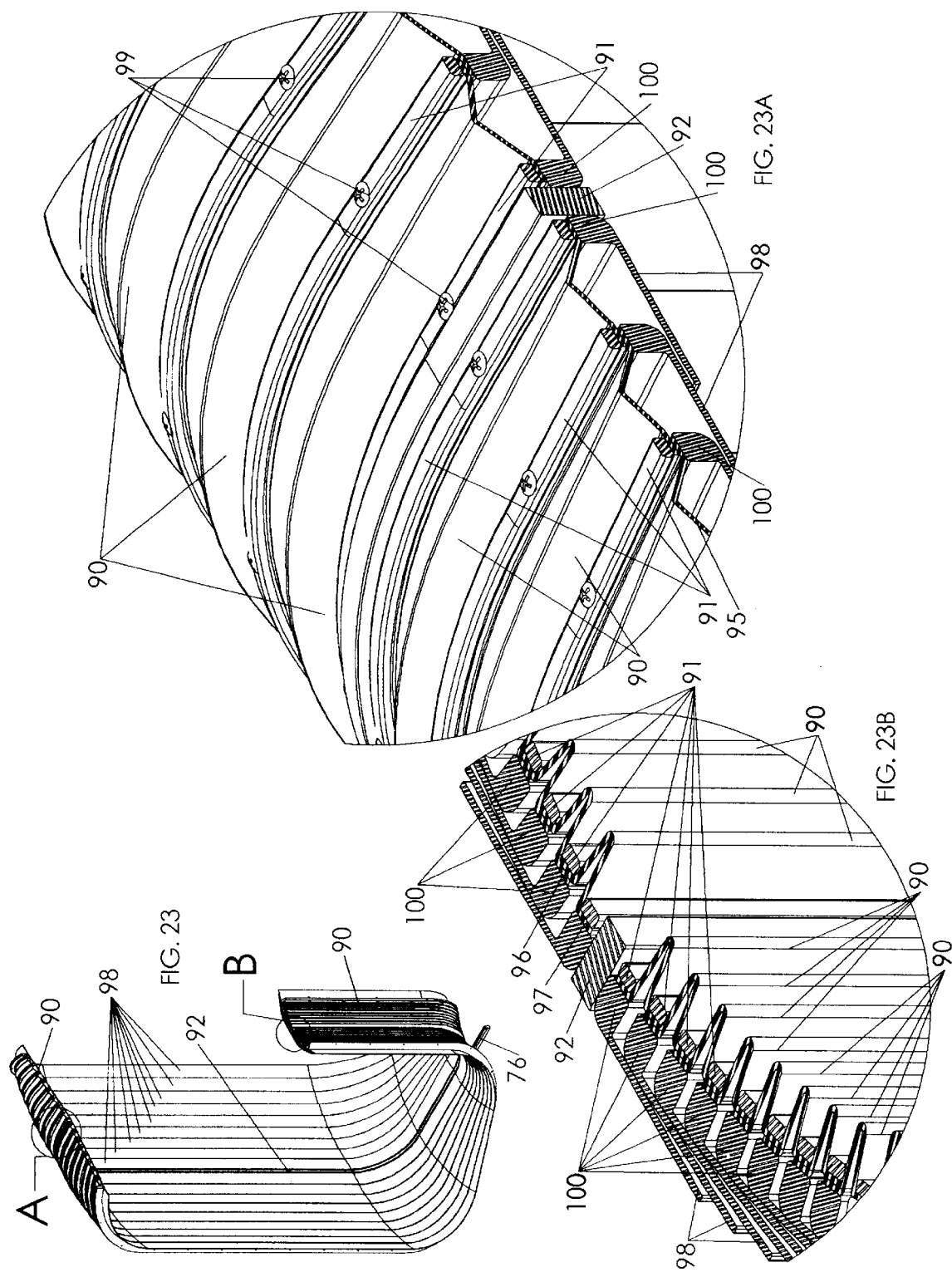

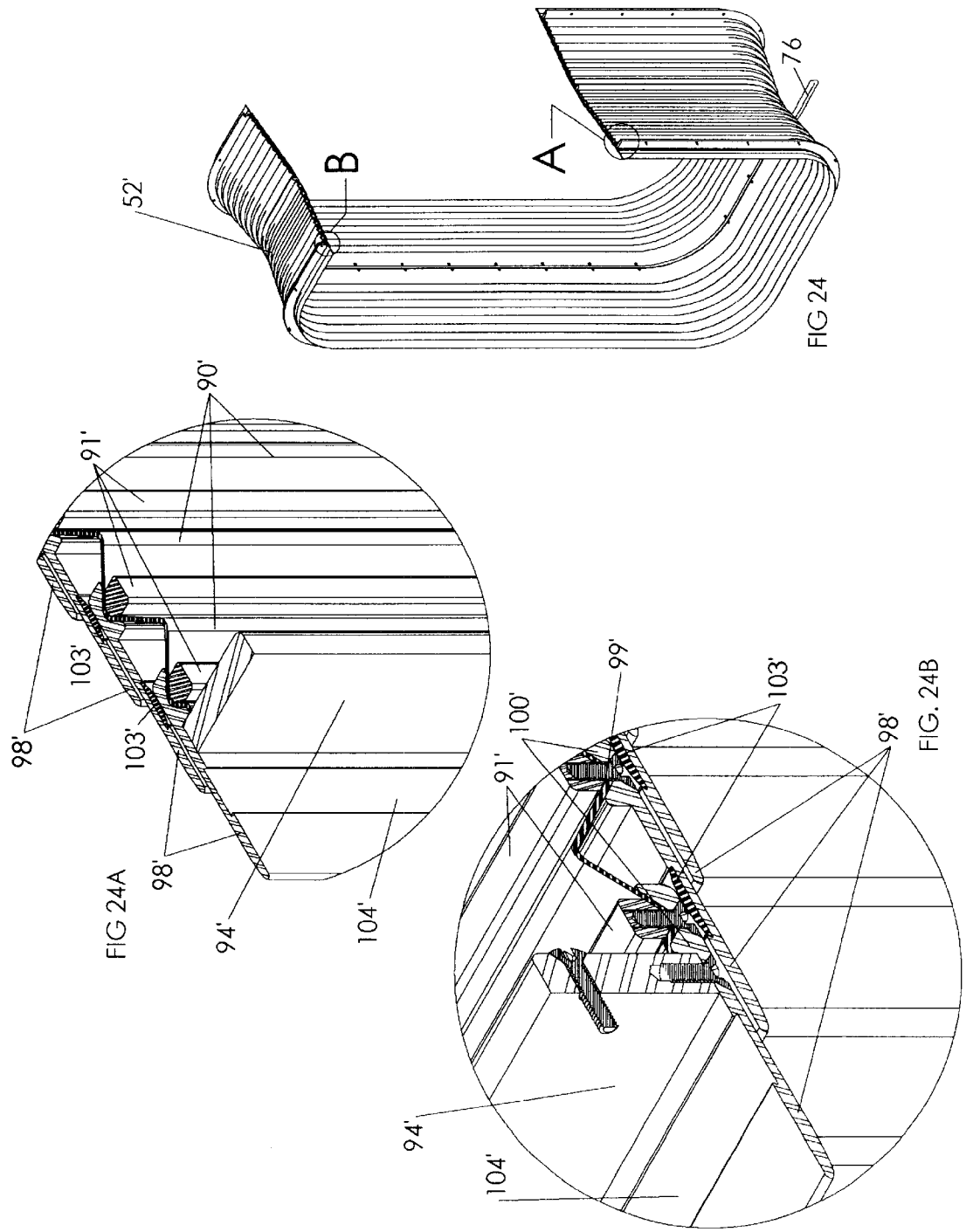

ARTICULATED PICKUP TRUCK CAMPER/TRAILER

This invention relates to recreational vehicles; and more particularly relates to a novel and improved wheeled vehicle combined with an articulated camper and trailer as well as to a new and improved articulated passageway for connection between habitable spaces.

BACKGROUND AND FIELD OF INVENTION

Recreational vehicles (RV) generally fall into two categories: those that are fully integrated into single use motor homes and those that are more flexible in that the habitable space can be quickly and easily separated from the motivating vehicle, permitting that vehicle's independent operation. In a motor home, a heavy truck or bus chassis is utilized as a foundation on which living accommodations are built. The structure is fully and permanently integrated into a unit that retains this single function. In a more flexible pickup camper or camping trailer, the habitable living space is not permanently attached to the vehicle. A pickup camper is designed to be lifted by jacks off of the truck bed and allow the pickup truck to drive away. Camping trailers are pulled by detachable ball hitches that can be disconnected in seconds to allow a towing vehicle to drive away. A motor home has a comfort and convenience advantage in that all the living space is accessible and usable by the occupants 100% of the time, whether parked or driving. It has the disadvantage that the truck chassis only has one function and cannot provide separate transportation when not used for recreation or when it arrives at a recreation site. The more flexible camper/camping trailer is usable as an independent vehicle, but requires the occupants to remain within the confines of the pickup cab and camper when traveling. The trailer cannot be occupied for legal and safety considerations while moving. This limitation is a significant loss of convenience for vacationers. It restricts access to kitchen, bathroom and bedroom accommodations while moving.

Representative of recreational vehicles which have been previously developed is that shown by U.S. Pat. No. 2,001,619 to Levoyer which discloses a motor vehicle with trailer for camping including a bellows. U.S. Pat. No. 3,834,752 to Cook et al discloses a bellows between a cab and a trailer box. U.S. Pat. No. 3,368,991 to Hathaway, Jr. discloses a bellows between a pickup truck and camper. U.S. Pat. No. 3,719,244 to Miller et al is of general interest for disclosing a camper mounted on a pickup with accessways between the two into the cab section of the pickup. U.S. Pat. No. 4,403,802 to Jones discloses a trailer unit for a vehicle including a bellows.

Other representative patents are U.S. Pat. Nos. 5,785,372 to Glatzmeier et al, 4,948,157 to Thudt, 4,762,191 to Hagin et al, 4,518,188 to Witten, 4,504,049 to Straub, 4,503,779 to Chadwick, 4,477,099 to Luyckx, 4,462,628 to Beckmann et al, 4,324,370 to Hagin et al, 4,247,128 to Knapp, 4,157,201 to Collins et al and 3,744,841 to Schmidt. Also of interest are the following foreign patents: WO 91/02672 to Walter, EU 0 631 890 A1 to Koch, DE 43 43 084 to Lenz et al and UK 1,196,077 to Blunt.

SUMMARY OF THE INVENTION

It is therefore an object of the present invention to provide for a novel and improved recreational vehicle which is extremely versatile, reliable and efficient.

Another object of the present invention is to provide for a recreational vehicle which combines the habitability of a motor home with the flexibility of a pickup camper/trailer.

Another object and feature of the present invention is to provide convenient access from a pickup bed mounted camper into a pickup cab via a door therebetween; and further wherein the access door is selectively movable between open and closed positions.

Another object of the present invention is to provide additional access between the driving vehicle and camper via a roof hatch in the vehicle which is aligned with a doorway between the vehicle and camper.

It is a further object to provide for an articulated camper and trailer having a novel and improved articulated and enclosed tunnel therebetween in further combination with means for controlling the degree of articulation of the tunnel.

The present invention resides in a recreational vehicle having a self-powered wheeled vehicle provided with a cargo bed, a camper housing releasably mounted on the cargo bed, a wheeled trailer including an articulated passage interconnecting the camper and the trailer in end-to-end relation to one another, and means for controlling the degree of articulation of said passage.

Both the pickup camper and trailer include a habitable living area or space for use at campsites as well as remote unimproved locations. The living spaces are separate from each other as well as from the cab of the pickup truck and do not require that the vehicle be stopped before the occupants may move safely between the truck cab, camper and trailer. The passage or tunnel affords safe and convenient access between the three spaces while the vehicle is in motion.

In the preferred form, access between the cab and the camper is via a combination roof hatch and bifold door at the rear of the cab, and access to the trailer from the camper is through a passage defined by an articulated, flexible tunnel permanently affixed to the rear of the camper and to the front of the trailer. The camper and trailer are also permanently connected to a ball joint coupling which cooperates with the articulated tunnel for optimum flexibility in traversing curves, hills and bumpy terrains.

The features described result in a vehicle which is safely habitable while driving to a destination and can quickly be separated on arrival into separate pickup truck and a stationary camper and trailer so as to allow the pickup truck to be used independently.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not, be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is an isometric view of a preferred form of vehicle in accordance with the present invention with articulated tunnel oriented in a straight attitude;

FIG. 2 is a side view of the preferred form of vehicle shown in FIG. 1;

FIG. 3 is a bottom plan view of the vehicle shown in FIGS. 1 and 2;

FIG. 4 is a top plan view of the vehicle shown in FIGS. 1 to 3;

FIG. 5 is a rear view of the preferred form of vehicle;

FIG. 6 is a front view of the preferred form of vehicle;

FIG. 7 is an isometric view of the preferred form of vehicle with articulated tunnel oriented at 45°;

FIG. 8 is a side view of the vehicle shown in FIG. 7;

FIG. 9 is a top plan view of the preferred form of vehicle in the attitude shown in FIG. 7;

FIG. 10 is a bottom plan view of the preferred form of vehicle in the attitude shown in FIG. 7;

FIG. 11 is an enlarged view from the side with portions broken away to show the interior of the camper and trailer, and the tunnel being illustrated at a 45° angle;

FIG. 11A is a detailed sectional view taken at A in FIG. 11 of the hitch coupling when the tunnel is straight;

FIG. 12 is another enlarged view from the rear with portions broken away to show the interior of the cab and camper, the tunnel being shown at a 45° angle;

FIG. 12A is a detail view partially in section of the hitch when the tunnel is straight;

FIG. 13 is an isometric view in exploded form of the preferred form of invention showing the pickup truck separated from the camper;

FIGS. 13A and 13B are detail views taken from A and B of FIG. 13;

FIG. 14 is an enlarged isometric view of the preferred form of pickup truck in accordance with the present invention;

FIG. 14A is a detail view taken at A of FIG. 14;

FIG. 14B is a detail view taken at B of FIG. 14;

FIG. 15 is another isometric view of the pickup truck shown in FIG. 14 with the roof hatch, cab doors and cargo bed gate shown in the open or released position;

FIG. 16 is a bottom isometric view of the vehicle with the jacks extended as shown in FIG. 13;

FIG. 16A is a detail view taken at A in FIG. 16;

FIG. 16B is a detail view taken at B in FIG. 16;

FIG. 16C is a detail view taken at C in FIG. 16;

FIG. 16D is a detail view similar to FIG. 16C illustrating the hitch at a 45° angle;

FIG. 17 is a side view in detail of the hitch shown at a 45° angle;

FIG. 18 is an enlarged isometric view of the articulated tunnel of the preferred form and oriented in a straight configuration;

FIG. 18A is a detail view taken at A in FIG. 18;

FIG. 20 is an enlarged side view of the articulated tunnel shown in FIG. 18;

FIG. 20A is a detail view taken at A of FIG. 20;

FIG. 20B is a detail view taken at detail B of FIG. 20;

FIG. 21 is an enlarged end view of the articulated tunnel shown in FIG. 18;

FIG. 21A is a detail view taken at A of FIG. 21;

FIG. 22 is a top view of the preferred form of articulated tunnel oriented at a 45° angle;

FIG. 22A is an enlarged top plan view of the articulated tunnel shown in FIG. 18 but oriented at a 45° angle;

FIG. 22B is a detail view taken at B of FIG. 22;

FIG. 23 is a fragmentary view of the articulated tunnel shown in FIG. 18 flexed at a 45° angle;

FIG. 23A is a detail view taken at A of FIG. 23;

FIG. 23B is a detail view taken at B of FIG. 23;

FIG. 24 is a fragmentary view of a modified form of articulated tunnel;

FIG. 24A is a detailed view taken at A of FIG. 24; and

FIG. 24B is a detailed view taken at B of FIG. 24.

DETAILED DESCRIPTION OF PREFERRED EMBODIMENT

Figure 19A:
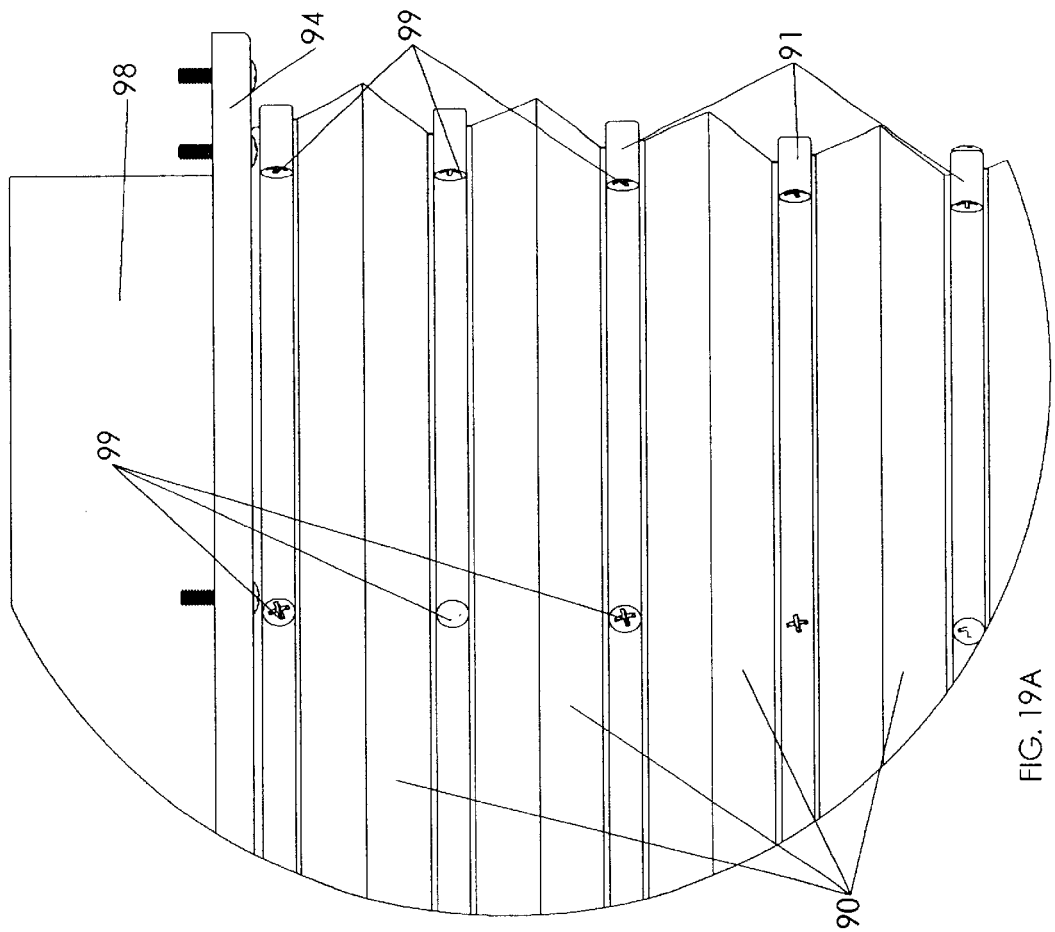
FIG. 19A is a detail view taken at A of FIG. 19.
Figure 19:
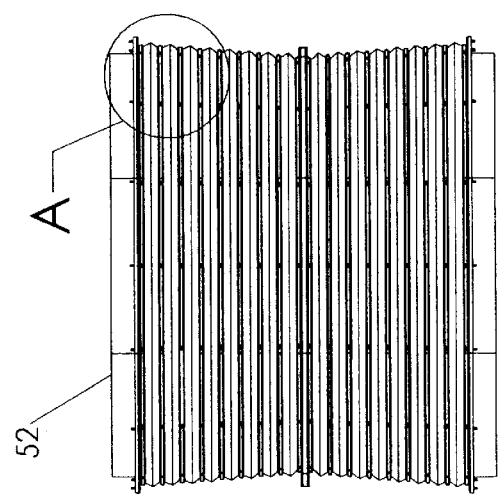
FIG. 19 is a top plan view of the articulated tunnel shown in FIG. 18.

Referring in detail to the drawings, a preferred form of recreational vehicle 10 is illustrated in FIGS. 1 to 23. As shown in FIGS. 1 to 12, the vehicle 10 is broadly comprised of a conventional pickup truck having a cab 12, truck bed 14 and ground-engaging wheels 16, a camper 24 and a trailer 36. The truck bed 14 includes the standard tailgate 15; however, the cab 12 and front portion of the truck bed 14 are modified, as best seen from FIGS. 13 to 15, to include a hatch 18 with a gasket seal 19 in the roof of the cab 12, and rear access doors 20 in a doorway 21 form a downward extension of the hatch 18. A gate 22 at the front end of the truck bed 14 is pivotal between a flat position on the bed 14 and an upright position extending across the access doors 20.

Referring to FIGS. 11 to 15, a pickup camper 24 is conformable for releasable mounting on the truck bed 14 and is basically of standard configuration having a main housing or living area 26, raised lateral lift surfaces 27 on opposite sides, a forwardly projecting overhang 28, and a rear portion 29 having a rear entryway 30. The front end of the camper 24 is modified to include a doorway 32 having doors 33 which are aligned with the doorway 21 in the cab. Similarly, the opening of the doorway 32 extends into the overhang 28 so as to afford access to the cab 12 from the camper 24 through the roof hatch 18 as well as the doorway 21 when the vehicle is in motion.

A trailer 36 having ground-engaging wheels 38 is permanently attached to the camper 24 by a ball joint coupling consisting of a socket 40 extending rearwardly from the back portion 31 of the camper 24 and a ball portion 41 extending forwardly from the lower end of a front wall 42 for universal connection to the socket 40, as shown in FIGS. 16 and 17. The trailer 36 takes the form of a generally rectangular housing or shell 44 which includes the front wall 42, opposite side walls 46 and a rear wall 48 and top panel 50. The shell provides living quarters 49 and includes suitable window areas $W_1$ and $W_s$ as well as a doorway 47. Access between the camper 24 and trailer 36 is through an articulated tunnel 52 which is sized to form an enclosed walkway for inhabitants between the camper and trailer living quarters both when the vehicle is at rest and when in motion. In particular, the tunnel 52 permits the vehicle to traverse uneven terrain, hills and curves, for example, as illustrated in FIGS. 7 to 10 without undergoing any reduction in cross-sectional dimension. When arriving at a destination, the camper 24 and trailer 36 can be separated from the pickup truck 11 so as to allow the pickup truck to be driven away for independent recreational use.

Referring again to FIGS. 13 to 16, in accordance with conventional practice, the camper 24 is provided with telescoping jacks 54 which are extendible downwardly from four corners of the underside of the camper. As shown in FIG. 13, the jacks 54 not only serve to raise the camper 24 from the truck bed 14 to enable the pickup truck 10 to be released from the camper 24 but also to store or maintain the camper 24 in a raised position in alignment with the trailer 36 when the truck 10 is detached. The jacks 54 are merely representative of various commercially available jack assemblies that may be utilized, and the jacks may be hydraulically, electrically or mechanically lifted and lowered in accordance with well-known practice. Also, the jacks 54 may be pivotally mounted at their upper ends in brackets 55 and the opposite lower ends 53 are clamped in brackets 53 when the jacks 54 are to be stored in their travel position. As a suitable alternative, the jacks also may telescope upwardly through suitable sockets, not shown, in the camper body.

In order to attach the camper 24 to the pickup truck 10, opposite side panels 17 of the truck bed 14 are provided with guide rails 56 along their upper edges, the guide rails 56 being received in channels 59 on the undersurfaces of the overhangs 27. As shown in FIG. 14A, the front end of each guide rail is provided with a lock bar 57 and, as shown in FIG. 14B, an end pin 58 projects rearwardly from the rear end of each guide rail 56. The lock bar 57 is insertable into a generally U-shaped bracket 60 at the front inside corner of each lateral overhang 27 of the camper 24 and is locked in place with a clevis pin 62. The end pin 58 at the rear end of each guide rail 56 is insertable into a socket 64 at the end of each channel 59 mounted under each lateral overhang 27, as shown in FIGS. 16 and 16B. When the pickup truck 10 is driven in reverse to slide beneath the camper 24, the camper should be spaced by the jacks 54 a slight distance above the guide rails until the end pin 58 is aligned beneath the entrance to the socket 64. The jacks are then adjusted to gradually lower the guide channel 59 on the underside of the overhang into mating engagement with the guide rails 56. The truck 10 is again reversed a very slight distance to cause the end pins 58 to be fully inserted into their respective sockets 64. Simultaneously, the roof hatch 18 will move into engagement with the doorway 32 of the camper. Assembly is completed by locking the clevis pin 62 to the lock bars 57 through holes in the bracket 60.

FIGS. 11A, 12A, 16C and 17 illustrate in detail the mounting of the hitch coupling 40, 41 beneath the articulated tunnel 52. The tunnel 52 as well as the coupling 40, 41 are flexible and capable of angular movement about a vertical axis through the joint of the coupling of at least 45° to permit sharp turns through a minimum turning radius. The tunnel 52 and coupling 40, 41 are further capable of undergoing a limited degree of torsional or twisting movement between the ball 41 and socket 40, for example, in negotiating uneven terrain. The ball and socket sections 40 and 41 are not intended to easily disconnect as with conventional trailer ball hitches and are intended more as a permanent coupling between the camper 24 and trailer 36. For this purpose, the socket 40 has a tongue 66 which extends from the trailer 24 and terminates in the socket portion 40, and a complementary tongue 68 extends from the trailer 36 and terminates in the ball 41. A center ring support socket 70 is mounted on the ball socket 40 and receives a support shaft 72 which terminates in a ball 69 inserted in the socket 70.

A center ring clamp 74 is mounted at the upper end of the shaft 72 beneath the articulated tunnel 52 and receives a slide bar 76, being fixed to the slide bar's center. Guide rods or struts 78 have balls 80 at opposite ends, one being inserted in a guide rod socket 82 in the tongue 66 on each side of the hitch ball 41 and the other ball inserted in a socket 84 mounted on each end of the slide bar 76. As best seen from FIGS. 12A and 17, the struts 78 slope upwardly from their socket connection 80 to the socket connection 84 and assist in stabilizing the turning motion of the tunnel 52 in a manner to be hereinafter described. In addition, support spacers 86 are mounted between the undersurface of each clamp ring of the tunnel 52 and the upper surfaces of the tongues 66, 68 to support the floor of the tunnel.

One preferred form of articulated tunnel 52 is shown in detail in FIGS. 18 to 23 and is broadly comprised of a bellows-shaped deformable interconnecting membrane 90 and clamp rings 91, a central reinforcing ring 92 to which the slide bar 76 is attached, and wall mount end rings 94 are permanently attached to correspondingly sized openings at the rear end of the camper 24 and leading end of the trailer 36, respectively. The bellows 90 is comprised of a series of generally V-shaped folds 95, each fold having opposed, offset connecting end portions 96 and 97, the end portion 96 being on one side of the fold which is slightly shorter than the opposite side of the fold. An end portion 97 of each fold 95 overlaps an end 96 of each adjacent fold, and the overlapping ends 96 and 97 are permanently affixed together between the clamping rings 91 and attaching ends 100 of a series of rigid metal or plastic sliding rings 98, as best seen from FIGS. 23A and 23B. The membrane is suitably composed of a urethane impregnated fabric or other material which will provide a flexible, durable and weather-resistant seal between the camper 24 and trailer 36. A series of the sliding rings 98 are arranged in overlapping relation to one another and have enlarged ring-like attaching ends 100 which are attached by fasteners 99 to the clamp rings 91, the sliding rings 98 being disposed in inner concentric relation to the membrane 90.

The sliding rings 98 are of open generally rectangular configuration with rounded corners so as to define the basic configuration of the tunnel 52. As such, the rings 98 define a series of overlapping sliding plates so as to establish a floor surface which can be traversed by the occupants in walking between the camper 24 and trailer 36 while the vehicle is in motion and, together with the bellows 90 and coupling 40, 41 will permit a full range of articulation. It will be appreciated that the rings 98 may be modified so that only the attaching ends 100 extend in the form of endless rings with the overlapping plates extending only along the bottom of the membrane to define the floor surface or walkway as described.

The spacers 86 are arranged, as best seen from FIGS. 11A, 12A and 20, to extend transversely beneath the tunnel along the upper flat surfaces 87 of the tongues 66 and 68. Each spacer 86 is in the form of an elongated, narrow rectangular plate positioned with its lower edge bearing against the flat surface 87 and with its upper edge permanently affixed to one of the attaching ends 100 and with overlapping ends 96 and 97 of the folds 95 clamped therebetween. The spacers 86 are uniformly spaced along the lengths of the tongues 66 and 68 and are free to follow sliding movement of the plates 98 in response to expansion and contraction of the tunnel 52. In this relation, the spacers 86 are substituted for that portion of the rings 91 extending beneath the tunnel 52. Each spacer's thickness increases progressively from the end rings 98 of the tunnel toward the center to just fill the gap between the camper and trailer tongue's upper surface 66, 68 and the concentric ring 98 to which it is attached.

DETAILED DESCRIPTION OF MODIFIED EMBODIMENT

FIGS. 24, 24A and 24B illustrate a modified form of articulated tunnel 52' in which the deformable membrane 90' is made up of a single continuous sheet of material that assumes a bellows-like cross-section when compressed between a convex end surface of the clamp ring 91' and concave surface of the attaching end 100' of the concentric ring 98'. The fasteners 99' that secure the rings 91' to each attaching end 100' are on the inside of the tunnel. In addition, a rubber strip 103 is installed in an extruded groove 104 around the outside circumference of each concentric ring 98' so as to act as somewhat of a shock absorber as well as sound reducer between the concentric rings 98' as they slide back and forth and resonate due to road-induced vibration.

It will be apparent that while the camper 24 and trailer 36 with articulated tunnel 52 therebetween have been described for use in connection with a pickup truck, other motorized vehicles having cargo beds may be employed. Moreover, the camper body itself may be readily modified to conform to different types and sizes of vehicles; or, in the alternative, the camper may form a unitary part of the motorized vehicle and need not necessarily be releasably attached to a truck bed or cargo bed. Nevertheless, the ability to releasably attach a camper to a cargo or truck bed as described is an important feature of the present invention in that it enables separation from the truck and independent use of the truck when at a destination for any length of time.

It is therefore to be understood that while a preferred and modified forms of invention are herein set forth and described, the above and other modifications and changes may be made in the construction and arrangement of elements as well as intended use of the apparatus without departing from the spirit and scope thereof as defined by the appended claims and equivalents thereof.

I claim:

1. A recreational vehicle comprising:
   a wheeled vehicle having a cargo bed;
   a camper releasably mounted on said cargo bed;
   a wheeled trailer including an articulated passage interconnecting a rear end of said camper and a forward end of said trailer in end-to-end relation to one another; and
   coupling means for limiting the degree of articulation of said passage.

2. A recreational vehicle according to claim 1 wherein said camper and said trailer include living quarters and said articulated passage defines a walkway for inhabitants to move between said camper and said trailer.

3. A recreational vehicle according to claim 2 wherein said passage is of generally rectangular configuration.

4. A recreational vehicle according to claim 1 wherein said wheeled vehicle includes a cab for a driver and a doorway in a rear portion of said cab adapted to be aligned with a doorway in a front end of said camper.

5. A recreational vehicle according to claim 4 wherein said cab includes a roof hatch in a roof of said cab, and said camper includes a forward raised end portion overlying said roof of said cab.

6. A recreational vehicle according to claim 1 wherein said wheeled vehicle is a pickup truck having a truck bed including a front gate, rear gate and side panels.

7. A recreational vehicle according to claim 6 wherein said front and rear gates are disposed in hinged relation to said truck bed, said doorway in said cab including a door hinged for opening and closing movement therethrough.

8. A recreational vehicle according to claim 7 wherein said front gate is pivotal into an upright position across said doorway in said cab to enable independent use of said pickup truck when not attached to said camper.

9. A recreational vehicle according to claim 8 wherein said camper includes front and rear pairs of camper jacks on opposite sides of said camper movable into ground-engaging relation, and lift means operative to move said camper jacks into ground-engaging relation for lifting and lowering said camper with respect to said pickup truck.

10. A recreational vehicle according to claim 9 wherein said camper includes raised lift surfaces on opposite sides being dimensioned to extend beyond opposite side panels of said pickup truck.

11. A recreational vehicle according to claim 10 wherein said lift surfaces and said side panels include latching means therebetween for releasably attaching said camper to said pickup truck.

12. A recreational vehicle according to claim 11 wherein each of said latching means includes a guide rail on one of said lift surface and side panel, a slide rail-receiving bracket on the other of said lift surface and said side panel, and locking means between said bracket and said guide rail.

13. A recreational vehicle according to claim 12 wherein each of said guide rails is mounted on one of said side panels and includes a connecting pin extending from an end of said guide rail into a socket in said camper.

14. A recreational vehicle according to claim 1 wherein a universal coupling extends between said camper and said trailer.

15. A recreational vehicle according to claim 14 wherein said coupling extends beneath said articulated passage.

16. A recreational vehicle according to claim 14 wherein said coupling is defined by a ball extending from one of said camper and said trailer and a socket extending from the other of said camper and said trailer.

17. A recreational vehicle according to claim 1 wherein said passage comprises a bellows-shaped membrane and a plurality of support members mounted at axially spaced intervals at least along a lower portion of said bellows so as to define said walkway between said camper and said trailer.

18. A recreational vehicle according to claim 17 wherein said support members are in the form of overlapping concentric rings slidable in response to axial expansion and contraction of said passage.

19. A recreational vehicle according to claim 18 wherein clamping members are provided for clamping each of said rings to said bellows.

20. A recreational vehicle according to claim 19 wherein said rings and said bellows are generally ring-like members, said rings extending internally of said bellows and said clamping members extending externally of said bellows.

21. A recreational vehicle according to claim 20 wherein a plurality of spacers extend between said coupling and said support members.

* * * * *